United States Patent
Su et al.

(10) Patent No.: US 11,614,171 B2
(45) Date of Patent: Mar. 28, 2023

(54) SOLENOID VALVE WITH HARD SEAL STRUCTURE

(71) Applicants: SHANGHAI KELAI MECHATRONICS ENGINEERING CO., LTD, Shanghai (CN); SHANGHAI OKWAY INTELLIGENT EQUIPMENT CO., LTD, Shanghai (CN)

(72) Inventors: Jianliang Su, Shanghai (CN); Haihong Zhang, Shanghai (CN); Junjie Shen, Shanghai (CN)

(73) Assignees: SHANGHAI KELAI MECHATRONICS CO., LTD, Shanghai (CN); SHANGHAI OKWAY INTELLIGENT EQUIPMENT CO., LTD, Shanghai (CN)

( * ) Notice: Subject to any disclaimer, the term of this patent is extended or adjusted under 35 U.S.C. 154(b) by 37 days.

(21) Appl. No.: 17/604,999

(22) PCT Filed: Jul. 16, 2021

(86) PCT No.: PCT/CN2021/106658
§ 371 (c)(1),
(2) Date: Oct. 20, 2021

(87) PCT Pub. No.: WO2022/116550
PCT Pub. Date: Jun. 9, 2022

(65) Prior Publication Data
US 2022/0349482 A1 Nov. 3, 2022

(30) Foreign Application Priority Data

Dec. 4, 2020 (CN) .......................... 202011397721.2

(51) Int. Cl.
*F16K 3/24* (2006.01)
*F16K 3/314* (2006.01)
(Continued)

(52) U.S. Cl.
CPC .............. *F16K 3/243* (2013.01); *F16K 1/425* (2013.01); *F16K 3/314* (2013.01); *F16K 27/029* (2013.01);
(Continued)

(58) Field of Classification Search
CPC .......... F16K 3/243; F16K 1/425; F16K 3/314; F16K 27/029; F16K 31/0624;
(Continued)

(56) References Cited

U.S. PATENT DOCUMENTS

2009/0020716 A1* 1/2009 Hokazono ............. F16K 31/047
251/129.11
2015/0114495 A1* 4/2015 Zhan ..................... F25B 41/325
137/596.12
(Continued)

FOREIGN PATENT DOCUMENTS

CN 111188912 5/2020

*Primary Examiner* — John Bastianelli
(74) *Attorney, Agent, or Firm* — JCIP Global Inc.

(57) ABSTRACT

A solenoid valve with a hard seal structure includes a valve body having a fluid passage and an accommodating cavity, and a valve assembly mounted inside the accommodating cavity. The valve assembly includes a fluid inlet seat, a valve core cooperating with the fluid inlet seat, and a driving mechanism for driving reciprocating motion of the valve core. The fluid inlet seat has a guide hole that allows the value core to stretch therein, a middle section of the fluid inlet seat has fluid inlet holes, and a lower section of the fluid inlet seat has a valve core fluid passage and a fluid passage slant located at the valve core fluid passage. The valve core includes a bigger-diameter section, a slant section, a smaller- (Continued)

diameter section and a valve core end slant sequentially arranged from up to down.

9 Claims, 9 Drawing Sheets

(51) Int. Cl.
    *F16K 31/06*     (2006.01)
    *F25B 41/325*     (2021.01)
    *F25B 41/34*     (2021.01)
    *F25B 41/345*     (2021.01)
    *F16K 27/02*     (2006.01)
    *F16K 1/42*     (2006.01)
    *B60H 1/00*     (2006.01)

(52) U.S. Cl.
    CPC ...... *F16K 31/0624* (2013.01); *F16K 31/0668* (2013.01); *F25B 41/325* (2021.01); *F25B 41/34* (2021.01); *F25B 41/345* (2021.01); *B60H 1/00485* (2013.01); *F25B 2600/2513* (2013.01)

(58) Field of Classification Search
    CPC .... F16K 31/0668; F25B 41/325; F25B 41/34; F25B 41/345; F25B 2600/2513; B60H 1/00485
    USPC .................................................... 251/129.15
    See application file for complete search history.

(56) References Cited

U.S. PATENT DOCUMENTS

2019/0368618 A1* 12/2019 Wei ........................... F16K 1/52
2019/0368792 A1* 12/2019 Tang .......................... F16K 1/50

* cited by examiner

SOLENOID VALVE WITH HARD SEAL STRUCTURE

CROSS-REFERENCE TO RELATED APPLICATION

This application is a 371 of international application of PCT application serial no. PCT/CN2021/106658, filed on Jul. 16, 2021 which claims the priority benefit of China application no. 202011397721.2, filed on Dec. 4, 2020. The entirety of each of the above mentioned patent applications is hereby incorporated by reference herein and made a part of this specification.

BACKGROUND

Technical Field

The present invention relates to a solenoid valve and in particular, relates to a solenoid valve with a hard seal structure.

Description of Related Art

An automobile air-conditioning system is easy to leak and $CO_2$ is generally used as a medium for its working refrigerant. However, a critical pressure of $CO_2$ is high (Pc=7.38 MPa) and a critical temperature of $CO_2$ is low (Tc=31.25° C.). In order to achieve favorable comprehensive refrigerating property, a refrigerating system with carbon dioxide as a refrigerant must work across a critical region and its working pressure exceeds the critical pressure. Compared with the current automobile air-conditioning system, its working pressure is much higher. For an electronic expansion valve/electronic stop valve that is currently working in a high-pressure refrigerating system to drive motion of a valve core under high pressure smoothly, a large-specification motor is employed and a speed reducer is additionally provided etc. on one hand to increase a driving force. Such a manner has defects like complicated structure, high energy consumption and difficult down-sizing. On the other hand, an end head of the valve core is designed in a shape of a needle tip, thereby reducing an area of a cross section so as to reduce a force acting on the valve core. Such a manner has defects like complicated processing of the valve core, and large non-linear region for flow adjustment.

The patent CN 111188912 A discloses a solenoid valve comprising a valve core, which has advantages like being easy to be driven, small size of a valve body and accurate and stable flow adjustment. However, it still has the following problems. A valve core seat of the patent is provided separately from a fluid inlet seat, and it is easy to cause leakage upon assembling between the valve core seat and the fluid inlet seat, especially in a case where a refrigerant medium is high-pressure $CO_2$. In addition, a rubber sealing ring is used for sealing between the valve core seat and the fluid inlet seat and a component connected thereto, which is also easy to cause leakage and failure, resulting in great reduction of the valve's service life.

SUMMARY

The objective of the present invention is to overcome the defects like difficult sealing and easy leakage existing in the prior art by providing a solenoid valve with a hard seal structure.

The objective of the present invention can be realized through the following technical solution.

A solenoid valve with a hard seal structure includes a valve body and a valve assembly. A fluid passage and an accommodating cavity are provided inside the valve body. The valve assembly is mounted inside the accommodating cavity, and the fluid passage is communicated to the accommodating cavity.

The valve assembly comprises a fluid inlet seat mounted at a bottom portion of the accommodating cavity, a valve core cooperating with the fluid inlet seat for closing or opening the fluid passage, and a driving mechanism for driving reciprocating motion of the valve core.

The fluid inlet seat is provided with a guide hole that allows a lower end of the valve core to stretch therein, a middle section of the fluid inlet seat is provided with a plurality of fluid inlet holes which are circumferentially arranged along the fluid inlet seat, and a lower section of the fluid inlet seat is provided with a valve core fluid passage and a fluid passage slant located at an upper portion of the valve core fluid passage for adjusting fluid flow.

The valve core comprises a bigger-diameter section, a slant section, a smaller-diameter section and a valve core end slant sequentially arranged from up to down, a diameter of the smaller-diameter section is smaller than a diameter of the valve core fluid passage, and a diameter of the bigger-diameter section is greater than a diameter of the valve core fluid passage.

Further, the fluid inlet seat is made of a hard material, a lower end of the valve inlet seat is machined with a lower bulge, and upon being axially compacted, and the lower bulge is embedded into a step surface of the valve body to achieve hard sealing connection.

An arc bulge is machined on an upper circumferential wall of the fluid inlet seat and upon being assembled, and the arc bulge squeezes an inner wall circumference of the accommodating cavity, to achieve interference fit and fluid medium seal.

Further, the driving mechanism comprises a screw and a driving element that drives the screw to rotate, an interior of the valve core is provided with an axial through hole, the screw is connected to the axial through hole by a thread, and the thread converts rotation of the screw into straight-line motion of the valve core. A pressure balancing channel is provided on the screw and/or the valve core, fluid entering the valve body fills, through the pressure balancing channel, a cavity where an upper end surface of the valve core is located and a cavity where a lower end surface of the valve core is located.

Further, the accommodating cavity is a cylindrical cavity inside which a step structure is provided, the driving mechanism further comprises a rotor mounting base match-mounted on the step structure, and the driving element comprises a rotor mounted on the rotor mounting base and a stator sleeved at periphery of the rotor and driving the rotor to rotate.

The rotor mounting base is threadedly fixed on the valve body, and an interior of the rotor mounting base is provided with a central step through hole that accommodates the valve core, a guide notch is provided inside the central step through hole, an upper end of the valve core is provided with a guide boss, and the guide boss is slidably connected to the guide notch.

An end portion of the rotor mounting base is provided with a mounting base bulge, and when the fluid inlet seat is axially compacted, the mounting base bulge is embedded into a step surface of the valve body to achieve hard sealing connection.

Further, an axial seal bearing cavity is provided over a guide hole of the fluid inlet seat and has a step-hole structure, a sealing ring in contact connection to the valve core, an axial sealing O-type ring sleeved to an outer side of the sealing ring and a transition plate provided at an upper portion of the sealing ring and an upper portion of the axial sealing O-type ring are provided inside the axial seal bearing cavity. The rotor mounting base squeezes the axial sealing O-type ring by the transition plate.

Further, an exterior of the stator is provided with a stator housing, and the stator housing is fixedly connected to an upper end surface of the valve body. An outer side wall of the rotor mounting base is provided with a notch to place an upper sealing ring, and the rotor mounting base and the stator housing are sealed through the upper sealing ring for dust protection.

Further, a platform surface (or a channel slot) is machined on a threaded cylindrical surface of the screw, and the pressure balancing channel is formed between the platform surface and the axial through hole of the valve core.

Further, the accommodating cavity forms a sealing housing having a sealing space, the sealing housing is covered at the exterior of the rotor and a lower end is fixedly and sealingly connected to the rotor mounting base by a rabbet.

The rotor is limitedly mounted inside the sealing housing by an upper bearing and a lower bearing, the lower bearing is mounted on a step of the central step through hole of the rotor mounting base, the upper bearing is mounted inside a bearing seat, the bearing seat is circumferentially fit-mounted to an inner wall of the sealing housing and an upper end of the bearing seat abuts against an inner surface of the sealing housing.

Further, one same valve body is provided with a plurality of accommodating cavities, and a valve assembly is mounted inside each of the accommodating cavities.

Further, the valve body is provided with a pressure releasing channel communicating to the fluid passage, and a port of the pressure releasing channel is mounted with a pressure releasing valve.

Compared with the prior art, the present invention has the following advantages.

The present invention manufactures the existing valve core seat and the fluid inlet seat into an integral fluid inlet seat, thereby not only realizing reduction of one component and improvement of assembling effects, but also avoiding the sealing problem of the assembly of the valve core seat and the fluid inlet seat, and leakage of the high-pressure refrigerant medium $CO_2$ is prevented. In addition, a lower end of the fluid inlet seat and a lower end portion of the rotor mounting base are provided with a bulge structure and upon being axially compacted, the bulge is embedded into a step surface of a valve body step hole, thereby realizing a hard sealing connection. An arc bulge is provided on an outer circumference of the fluid inlet seat and upon being assembled, the arc bulge squeezes an inner wall circumference of the accommodating cavity, thereby realizing a hard seal for interference fit. The structure reduces the number of rubber sealing rings to be used to a maximum extent, thereby avoiding sealing failure occurring to a conventional rubber sealing ring and greatly increasing service life of the solenoid valve.

DESCRIPTION OF THE EMBODIMENTS

The present invention is described in detail with reference to the particular embodiments below. The following embodiments will be conducive to further understanding by those skilled in the art on the present invention, but is not intended to limit the present invention in any forms. It should be pointed out that for those of ordinary skill in the art, the present invention can be transformed and modified in many ways without departing from the conception of the present invention. All of these fall within the scope of protection of the present invention.

Embodiment

A solenoid valve with a hard seal structure, as shown in FIG. 1, FIG. 2, FIG. 3, FIG. 4 and FIG. 5, comprises a valve body 1, a fluid inlet seat 3, a rotor mounting base 4, a valve core 5, a screw 6, a rotor 7, a lower bearing 8, an upper bearing 9, a bearing seat 10, a sealing housing 11, a stator 12, a stator control plate 13, a pressure releasing valve 14 and a stator housing 23 etc.

As shown in FIG. 6, FIG. 7, FIG. 8 and FIG. 9, the valve body 1 is provided with a first accommodating cavity 101, a second accommodating cavity 102, a longitudinal channel 103, a first transverse channel 104, a second transverse channel 105 and a third transverse channel 106. Inside the valve body 1, the first transverse channel 104 communicates to the longitudinal channel 103, the first accommodating cavity 101 and the second accommodating cavity 102 communicate to the longitudinal channel 103 through respective vertical channels, an end head of longitudinal channel 103 is mounted with a pressure releasing valve 14 and when pressure in the longitudinal channel 103 exceeds a set valve, the pressure releasing valve 14 is open to release pressure. The second transverse channel 105 communicates to the first accommodating cavity 101. The third transverse channel 106 communicates to the second accommodating cavity 102, the first transverse channel 104, the second transverse channel 105, the third transverse channel 106 and the longitudinal channel 103 constitute a fluid passage, fluid can flow inside from the second transverse channel 105 and the third transverse channel 106 and flow outside through the longitudinal channel 103 and the first transverse channel 104. The fluid can also flow inside from the first transverse channel 104 and flow outside from the second transverse channel 104 and the fluid can flow inside from the second transverse channel 105 and flow outside from the first transverse channel 104. Fluid flows inside the solenoid valve in two directions, as the solenoid valve in the embodiment does not limit a flow direction of fluid. The accommodating cavity is cylindrical and axially designed with a step, and two accommodating cavities are respectively mounted with two sets of valve assemblies. The fluid inlet seat 3 and the rotor mounting base 4 are mounted into the accommodating cavity sequentially arranged from up to down, the screw 6 is connected to the valve core 5 through a thread, the rotation of the screw 6 is converted into an up-down straight-line motion of the valve core 5 through a thread. The valve core 5 and the fluid inlet seat 3 cooperate with each other to realize flow adjustment.

Figure 10:
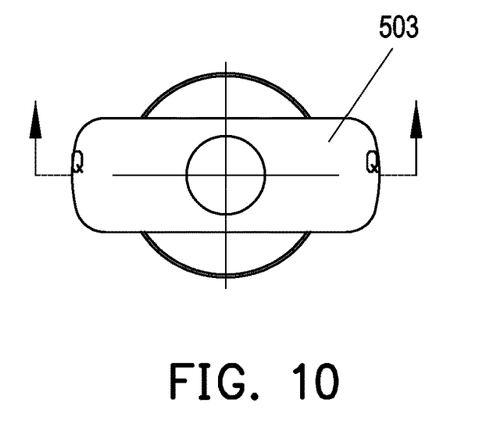
FIG. 10 is a top view of a valve core in the present invention.
Figure 11:
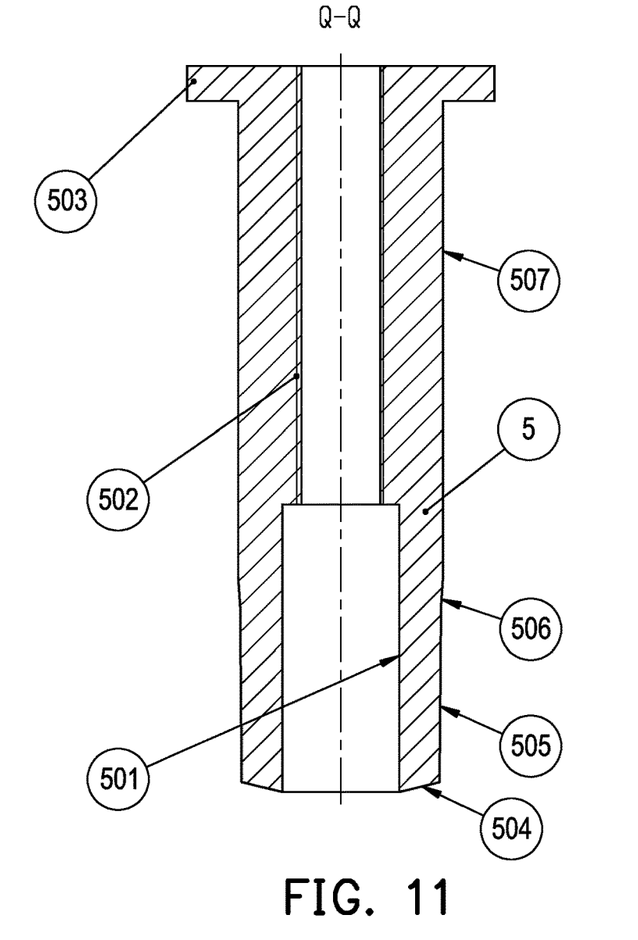
FIG. 11 is a Q-Q section view of FIG. 6.

As shown in FIG. 10 and FIG. 11, a center of the valve core 5 is provided with a penetrating step hole 501, an upper section of the step hole 501 is machined with a fine precise internal thread 502 meshing with the screw 6, and the valve core 5 is provided with a guide boss 503, and includes a bigger-diameter section 507, a slant section 506, a smaller-diameter section 505 and a valve core end slant 504 provided at a bottom end surface of the valve core 5 that are sequentially arranged from up to down.

Figure 4:
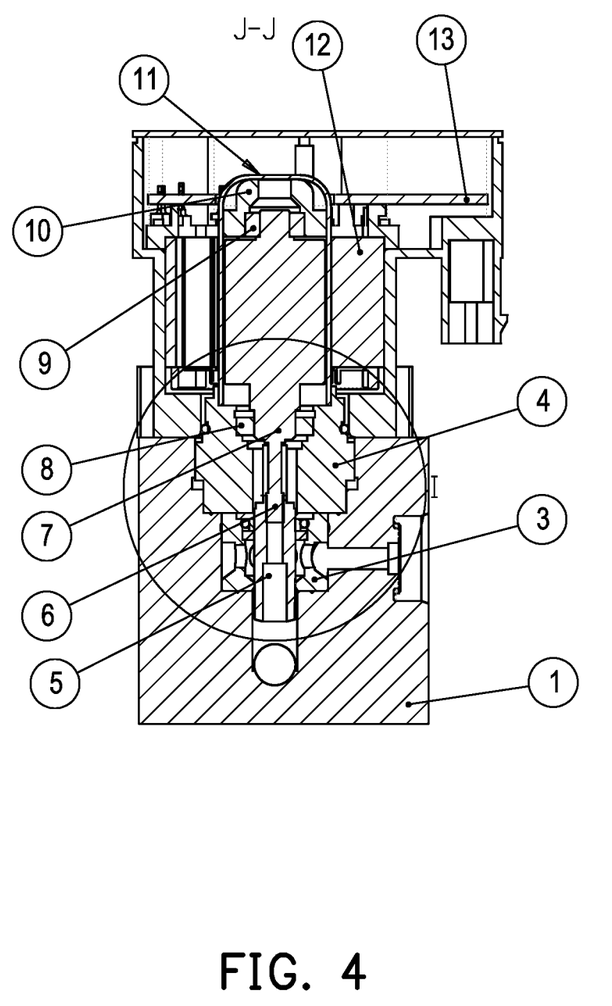
FIG. 4 is a J-J section view of FIG. 3.
Figure 12:
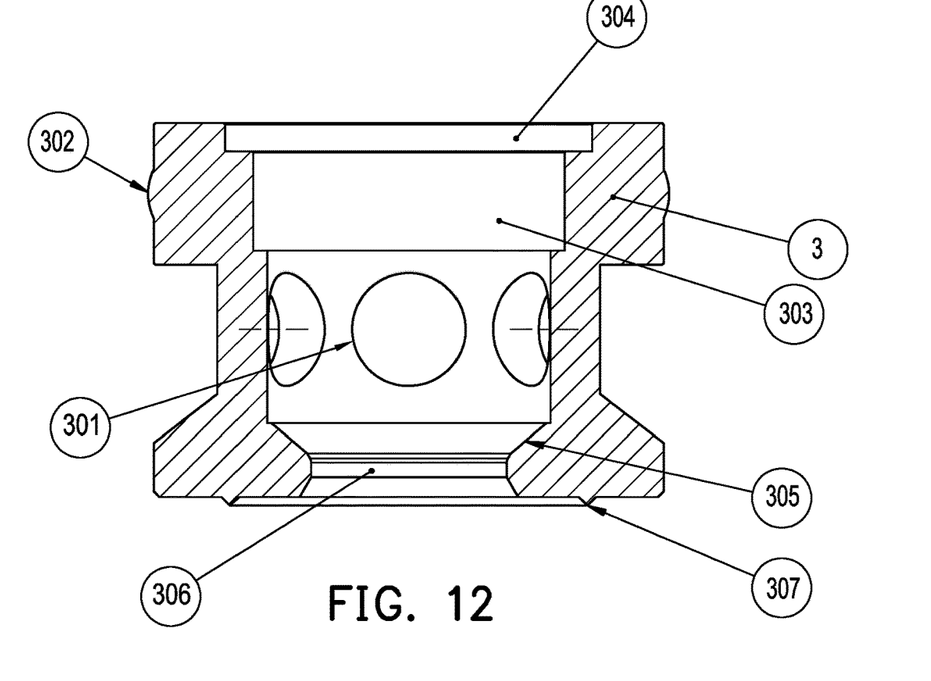
FIG. 12 is a section view of a main view direction of a fluid inlet seat in the present invention.

As shown in FIG. 4, the fluid inlet seat 3 is placed at a bottom portion of the accommodating cavity. As shown in FIG. 12, the fluid inlet seat 3 is provided with a guide hole 303 that allows a lower end of the valve core 5 to stretch therein. A middle section of the fluid inlet seat 3 is provided with a plurality of fluid inlet holes 301 which are circumferentially arranged along the fluid inlet seat 3, and a lower section of the fluid inlet seat 3 is provided with a valve core fluid passage 306 and a fluid passage slant 305 located at an upper portion of the valve core fluid passage 306 for adjusting fluid flow. The fluid inlet seat 3 is made of a hard material, and an arc bulge 302 is machined on an upper circumferential wall of the fluid inlet seat. Upon being assembled, the arc bulge 302 squeezes an inner wall circumference of the accommodating cavity, thereby realizing interference fit and fluid medium seal. A lower end of the valve inlet seat 3 is machined with a lower bulge 307, and upon being axially compacted, the lower bulge 307 is embedded into a step surface of the valve body, thereby realizing a hard sealing connection.

As shown in FIG. 11, a lower end surface of the valve core 5 is designed with a valve core end slant 504 matching a fluid passage slant 305. At a stage of adjusting a large flow, a channel between the valve core end slant 504 and the fluid passage slant 305 is a flow path of a refrigerant. By adjusting an upper position and a lower position of the valve core 5, an area of a cross section of the flow path is linearly adjusted, so as to further adjust flow of the refrigerant linearly. A size of the smaller-diameter section 505 of the valve core 5 is a little smaller than a hole diameter of a valve core fluid passage 306; and a size of the bigger-diameter section 507 is greater than a hole diameter of the valve core fluid passage 306. When the valve core declines to a certain extent, contact of the slant section 506 with the valve core fluid passage 306 is realized, thus realizing a function of a stop valve. By adjusting different positions of the valve core 5 in the fluid inlet seat 3, one same valve can stop flow of the refrigerant between channels, i.e. used as a stop valve, and can also realize expansion of the refrigerant between channels, i.e. used as an expansion valve.

Figure 5:
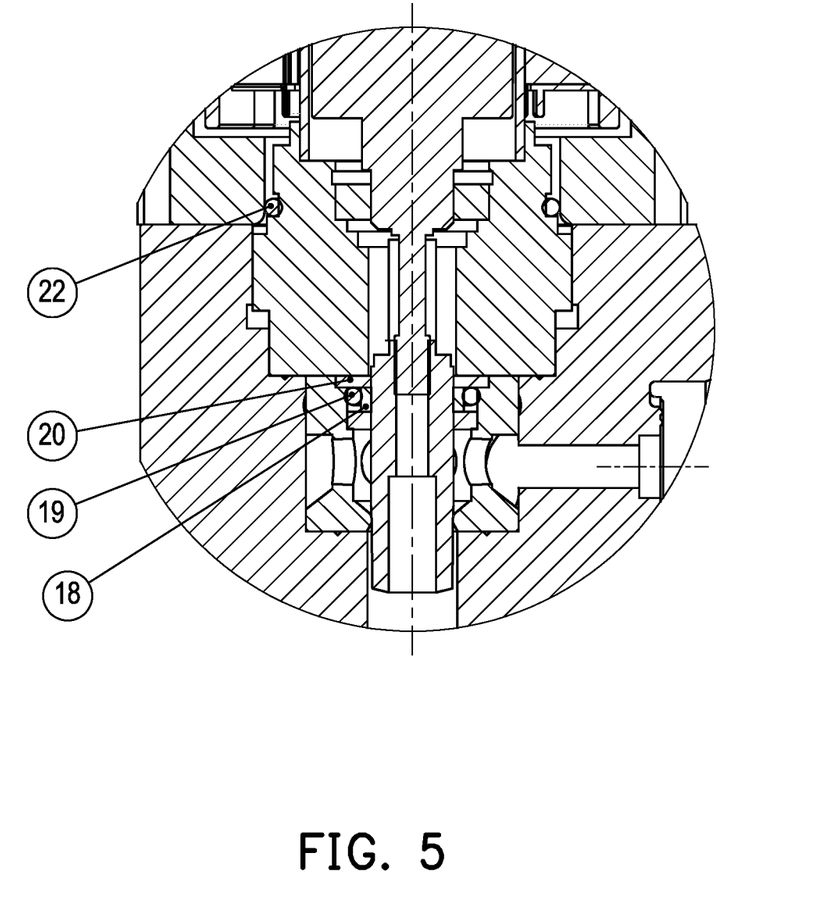
FIG. 5 is a locally enlarged view of FIG. 4.
Figure 6:
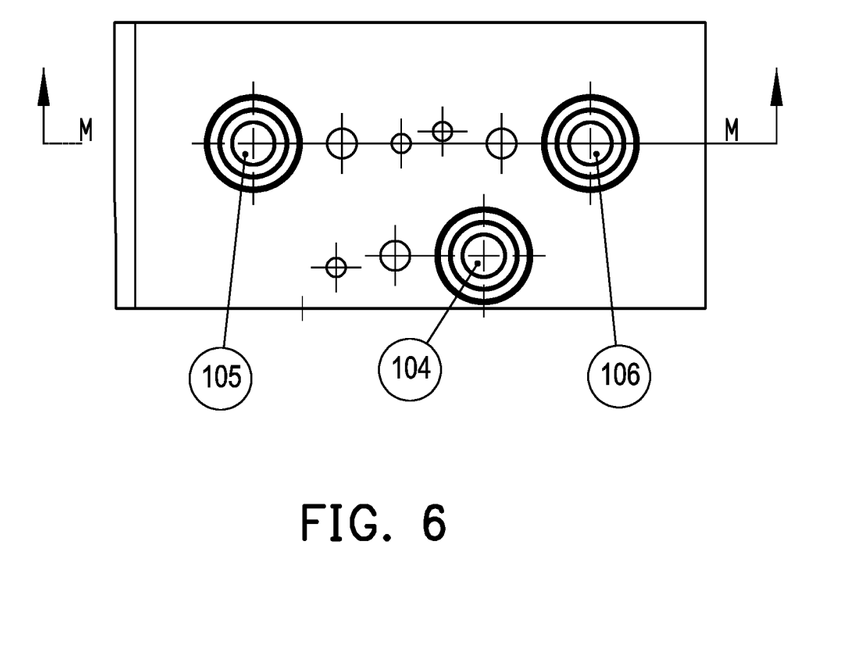
FIG. 6 is a main view of a valve body in the present invention.
Figure 7:
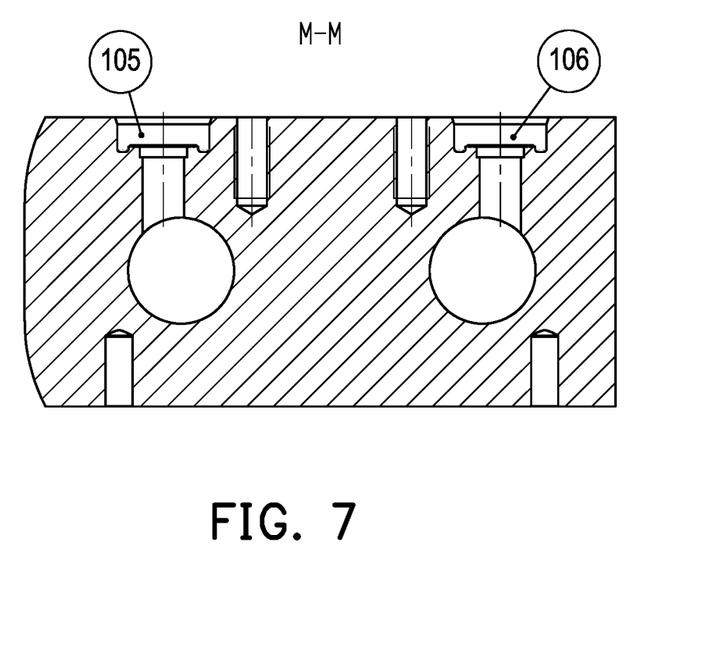
FIG. 7 is an M-M section view of FIG. 6.
Figure 8:
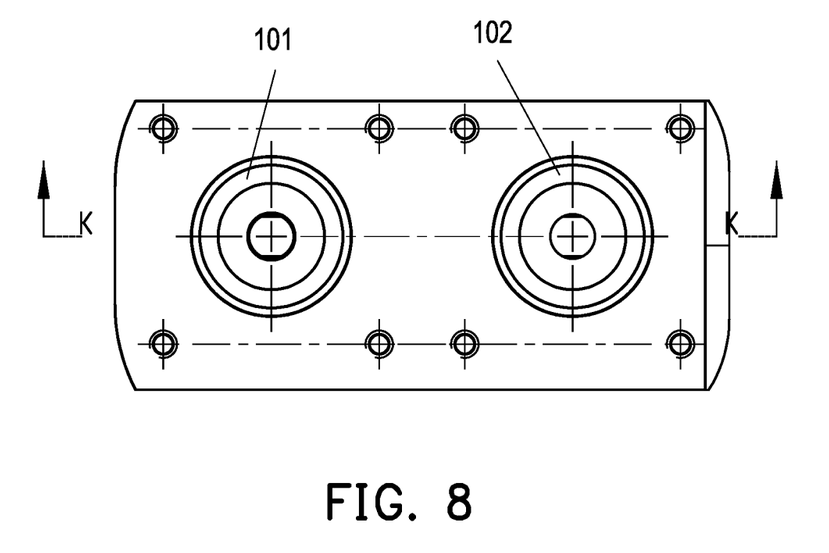
FIG. 8 is a top view of a valve body in the present invention.
Figure 9:
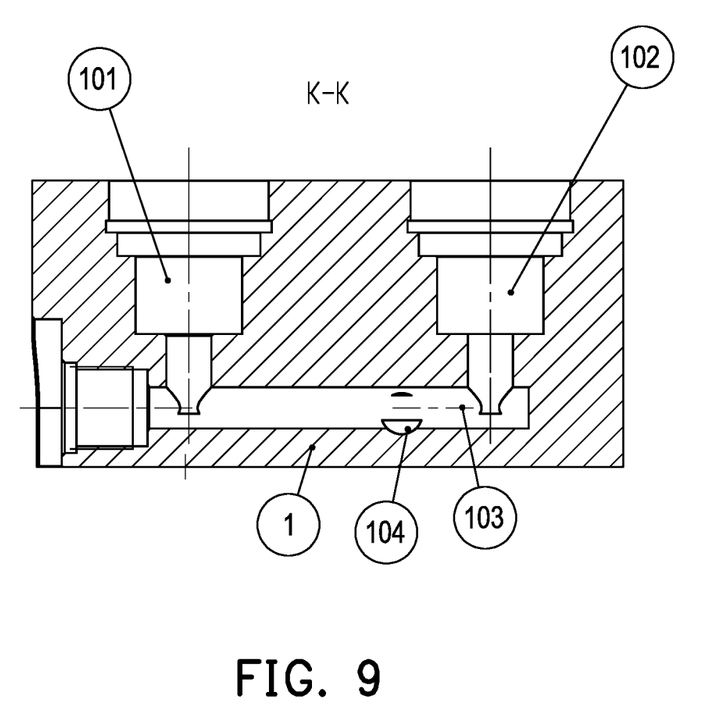
FIG. 9 is a K-K section view of FIG. 8.

A lower portion of the fluid inlet seat 3 is circumferentially provided with a plurality of fluid inlet holes 301 to reduce a flow rate of an incoming refrigerant, decrease noise generated by flow of the refrigerant, and avoid direct impact of the refrigerant on the valve core 5. A center of the fluid inlet seat 3 is provided with a guide hole 303 that accommodates the valve core 5, thereby realizing a centering support for up-down motion of the valve core 5. An upper end surface of the fluid inlet seat 3 is provided with an axial seal bearing cavity 304. As shown in FIG. 5, a sealing ring 18, an axial sealing o-type ring 19 and a transition plate 20 are placed inside the axial seal bearing cavity 304. A force transferred from the rotor mounting base 4 enables deformation of the axial sealing o-type ring 19 through the transition plate 20, so as to squeeze the sealing ring 18 to cling to and support the valve core 5 inside the guide hole 303 and ensure sealing of the valve core 5 during up-down motion. The bigger-diameter section 507 of the valve core 5 is in oil sliding cooperation with the guide hole 303 to ensure straight-line motion of the valve core 5.

Figure 13:
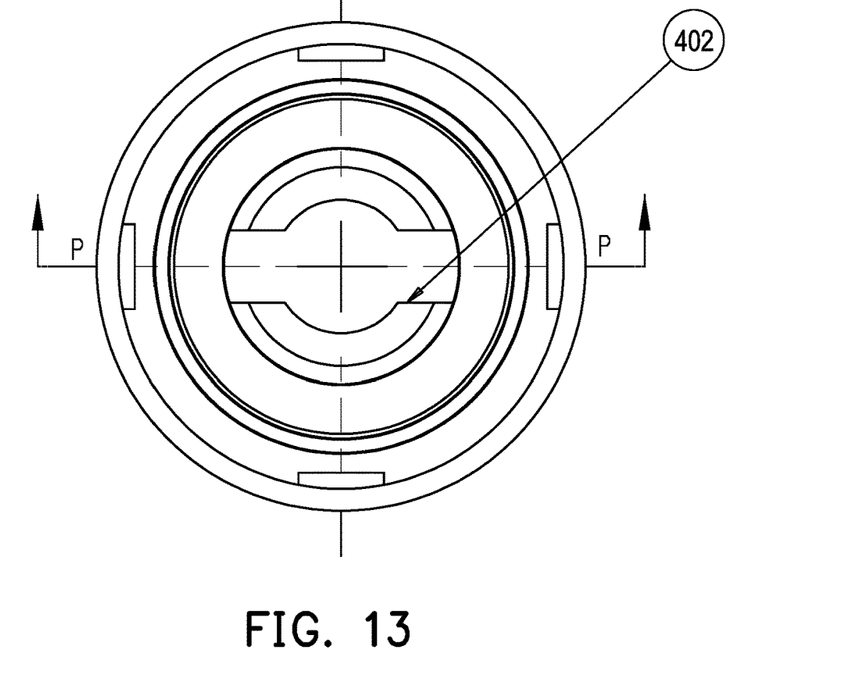
FIG. 13 is a top view of a rotor mounting base in the present invention.
Figure 14:
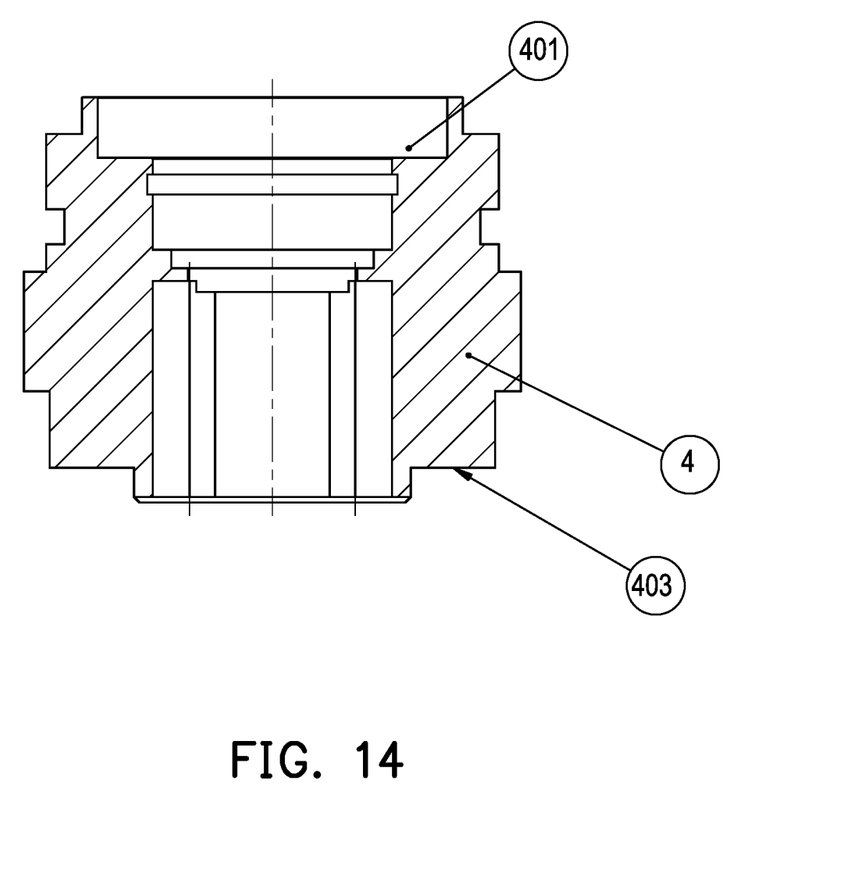
FIG. 14 is a P-P section view of FIG. 13.

The rotor mounting base 4 is placed above the fluid inlet seat 3 through cooperation of steps inside the accommodating cavity. As shown in FIG. 13 and FIG. 14, the rotor mounting base 4 is provided with a slot to place the o-type sealing ring. Inside the slot, an upper sealing ring 22 is placed. An end portion of the rotor mounting base 4 is provided with a mounting base bulge 403 and upon being axially compacted, the mounting base bulge 403 is embedded into a step surface of the accommodating cavity of the valve body 1, thereby realizing a hard sealing connection.

The rotor mounting base 4 is fixedly connected to the valve body 1 through a thread and a center of the rotor mounting base 4 is provided with a central step through hole 401 and a rectangular-structured guide notch 402. The guide boss 503 of the valve core 5 cooperates with the guide notch 402 to limit rotation of the valve core 5. Through transmission of a threaded pair and guidance of the guide boss 503, the rotational motion of the screw 6 is converted into an up-down motion of the valve core 5.

The screw 6 is fixedly connected to the rotor 7 by integral casting or interference fit or other manners. A threaded cylindrical surface of the screw 6 is machined with a platform surface, and an outer circumference of the screw 6 is machined with a fine precise external thread meshed with the fine precise internal thread 502. A pressure balancing channel is formed between the platform surface of the screw 6 and the step hole 501 of the valve core 5, and the pressure balancing channel communicates a cavity where an upper end surface of the valve core 5 is located with a cavity where a lower end surface of the valve core 5 is located. Refrigerant is filled to the cavities where the upper and lower end surfaces of the valve core 5 are located through a gap between the platform surface and the step hole 501. The upper and lower end surfaces are both located at a same pressure region of the refrigerant. Therefore, it is not necessary to overcome the pressure of the refrigerant for driving running of the valve core 5, as a smaller force can drive fast motion of the valve core 5, such that the valve can work in a refrigerant system of any pressure and especially has advantages in a high-pressure refrigerant system.

Figure 1:
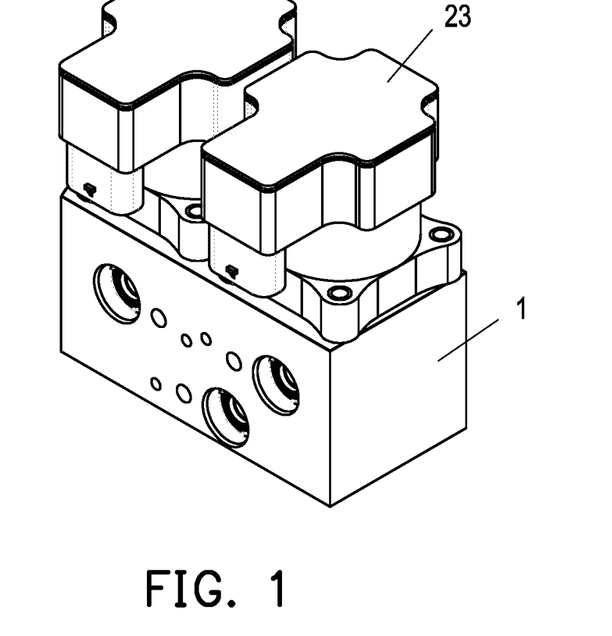
FIG. 1 is a structural diagram of the present invention.
Figure 2:
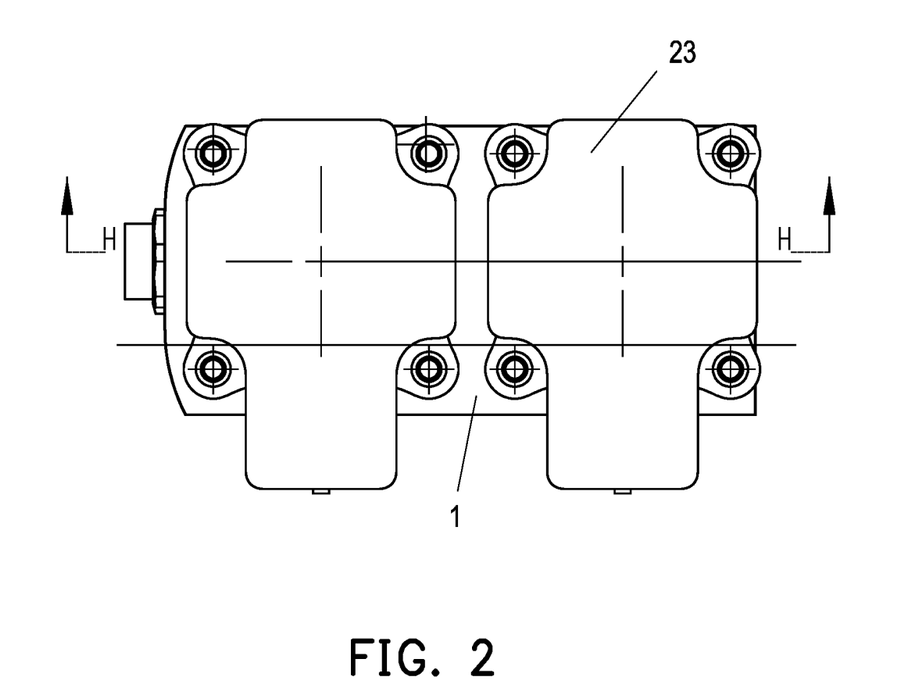
FIG. 2 is a top view structural diagram of the present invention.
Figure 3:
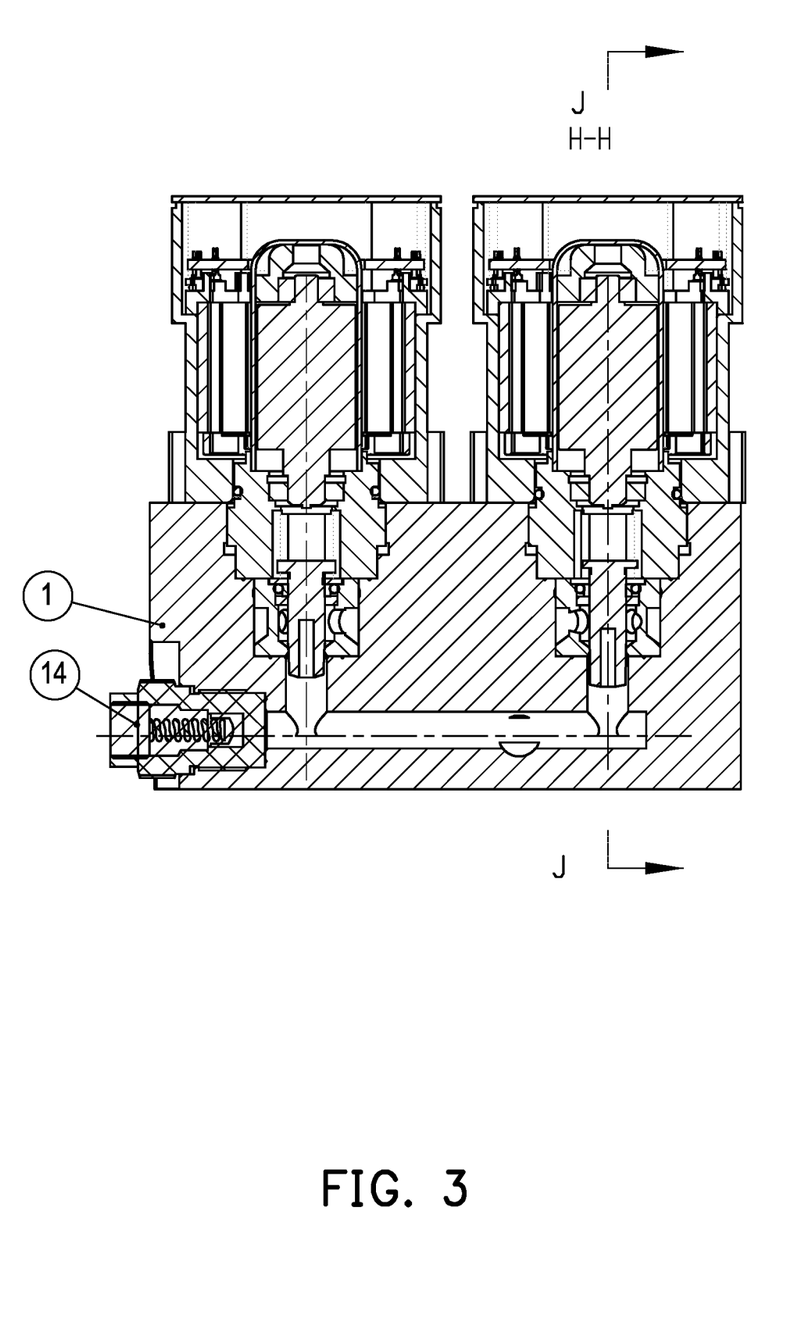
FIG. 3 is an H-H section view of FIG. 2.

As shown in FIG. 4, the rotor 7 consists of a permanent-magnet silicon steel sheet and is accommodated at an inner cavity of the sealing housing 11. Supported by the upper bearing 9 and the lower bearing 8, the rotor is driven by the stator 12 to rotate about an axis under support limit of the upper and lower bearings, thereby removing up-down tailing of the rotor. The upper bearing 9 is mounted inside the bearing seat 10, the bearing seat 10 is circumferentially cooperated at the inner cavity of the sealing housing 11, and the upper end abuts against a bottom surface of the sealing housing 11. The sealing housing 11 cooperates with the rotor mounting base 4 through a rabbet, and a fixed connection to the rotor mounting base 4 is realized through a laser welding manner. As shown in FIG. 1 and FIG. 5, the stator 12 is sleeved to the periphery of the rotor housing 11, and is fixedly connected to an upper end surface of the valve body 1 through a bolt. The stator housing 23 is sleeved outside of the stator 12. The stator control plate 13 is fixed inside the stator housing 23, and is connected to a coil of the stator through a manner of pressed-connection with a pin. By powering a connecting plug, a circuit and a chip for control and driving are configured thereon, thereby realizing control over the stator, so as to further control a rotational speed, a rotational angle and an output torque of the rotor.

In the embodiment, one same valve body 1 is configured with two accommodating cavities and valve assemblies thereon to reduce connection pipes between valves. Combinations of various functions can be realized to satisfy the requirements of adjusting the refrigerant under different working conditions of the automobile $CO_2$ air-conditioning system.

The working principles of the embodiment are as follows.

An initial state is a full-flow full-capacity state (an area of a channel section between the valve core end slant 504 and the fluid passage slant 305 of the valve core 5 is greater than an area of a cross section of the valve core fluid passage 306). Controlled by the stator control plate 13, the rotor 7 rotates. Through meshing transmission of a fine precise thread pair, the valve core 5 moves downward, and the gap between the valve core end slant 504 and the fluid passage slant 305 becomes smaller gradually, thereby entering a state of linearly adjusting a large flow. Through the first transverse channel 103 and the second transverse channel 105 (or the third transverse channel 106), the flow of the refrigerant decreases linearly (functioning as an electronic expansion valve). When the smaller-diameter section 505 of the valve core 5 starts to stretch into the valve core fluid passage 306, it enters a small-flow state with constant flow output. A circulating cross section at this time is an area of a constant gap between the valve core fluid passage 306 and the smaller-diameter section 505. The valve core 5 moves further downward, the slant section 506 of the valve core 5 contacts the valve core fluid passage 306, and the refrigerant flow path is totally closed (functioning as an electronic stop valve). The rotor moves in an opposite direction and the working state changes from a stop state to a small-flow constant output state and then to a big-flow linear adjustment state and finally returns to a full-flow full-capacity state.

The present invention manufactures the existing valve core seat and the fluid inlet seat into an integral fluid inlet seat, thereby not only realizing reduction of one component and improvement of assembling effects, but also avoiding the sealing problem of the assembly of the valve core seat and the fluid inlet seat, and leakage of the high-pressure refrigerant medium $CO_2$ is prevented. In addition, a lower end of the fluid inlet seat 3 and a lower end portion of the rotor mounting base 4 are provided with a bulge structure and upon being axially compacted, the bulge is embedded into a step surface of a valve body step hole, thereby realizing a hard sealing connection. An arc bulge 302 is provided on an outer circumference of the fluid inlet seat and upon being assembled, the arc bulge squeezes an inner wall circumference of the accommodating cavity, thereby realizing a hard seal for interference fit. The structure reduces the number of rubber sealing rings to be used to a maximum extent, thereby avoiding sealing failure occurring to a conventional rubber sealing ring and greatly increasing service life of the solenoid valve. The particular embodiments of the present invention are described as above. It may be understood that the present invention is not limited to the above particular embodiments, and various changes or modifications may be made by those skilled in the art within the scope of claims, which does not influence the substantial content of the present invention.

What is claimed is:

1. A solenoid valve with a hard seal structure, the solenoid valve comprising a valve body and a valve assembly, wherein a fluid passage and an accommodating cavity are provided inside the valve body, the valve assembly is mounted inside the accommodating cavity, and the fluid passage is communicated to the accommodating cavity, the valve assembly comprises a fluid inlet seat mounted at a bottom portion of the accommodating cavity, a valve core cooperating with the fluid inlet seat for closing or opening the fluid passage, and a driving mechanism for driving reciprocating motion of the valve core;

wherein the fluid inlet seat is provided with a guide hole that allows entry of a lower end of the valve core, a middle section of the fluid inlet seat is provided with a plurality of fluid inlet holes which are circumferentially arranged along the fluid inlet seat, and a lower section of the fluid inlet seat is provided with a valve core fluid passage and a fluid passage slant located at an upper portion of the valve core fluid passage for adjusting fluid flow;

the valve core comprises a bigger-diameter section, a slant section, a smaller-diameter section and a valve core end slant sequentially arranged from up to down, a diameter of the smaller-diameter section is smaller than a diameter of the valve core fluid passage, and a diameter of the bigger-diameter section is greater than a diameter of the valve core fluid passage, a lower end of the fluid inlet seat is provided with a lower bulge, and upon being axially compacted, the lower bulge is embedded into the valve body in hard sealing connection; and an arc bulge is formed on an upper circumferential wall of the fluid inlet seat, and upon being assembled, the arc bulge abuts against an inner wall circumference of the accommodating cavity in interference fit to seal fluid medium.

2. The solenoid valve with a hard seal structure according to claim 1, wherein the driving mechanism comprises a screw and a driving element that drives the screw to rotate, an interior of the valve core is provided with an axial through hole, the screw is connected to the axial through hole by a thread, and the thread converts rotation of the screw into straight-line motion of the valve core; and a pressure balancing channel is provided on the screw and/or the valve core, fluid entering the valve body passes, through the pressure balancing channel, and the fluid fills a cavity where an upper end surface of the valve core is located and a cavity where a lower end surface of the valve core is located.

3. The solenoid valve with a hard seal structure according to claim 2, wherein the accommodating cavity is a cylindrical cavity inside which a step structure is provided, the driving mechanism further comprises a rotor mounting base match-mounted on the step structure, and the driving element comprises a rotor mounted on the rotor mounting base and a stator sleeved at a periphery of the rotor and driving the rotor to rotate;

the rotor mounting base is threadedly fixed on the valve body, and an interior of the rotor mounting base is provided with a central step through hole that accommodates the valve core, a guide notch is provided inside the central step through hole, an upper end of the valve core is provided with a guide boss, and the guide boss is slidably connected to the guide notch; and an end portion of the rotor mounting base is provided with a mounting base bulge, and upon being axially compacted, the mounting base bulge is embedded into a step surface of the valve body to achieve hard sealing connection.

4. The solenoid valve with a hard seal structure according to claim 3, wherein an axial seal bearing cavity is provided over a guide hole of the fluid inlet seat and has a step-hole structure, a sealing ring in contact connection to the valve core, an axial sealing O-type ring sleeved to an outer side of the sealing ring, and a transition plate provided at an upper portion of the sealing ring and an upper portion of the axial sealing O-type ring are provided inside the axial seal bearing cavity; and the rotor mounting base squeezes the axial sealing O-type ring by the transition plate.

5. The solenoid valve with a hard seal structure according to claim 4, wherein an exterior of the stator is provided with a stator housing, the stator housing is fixedly connected to an upper end surface of the valve body; and an outer side wall of the rotor mounting base is provided with a notch to place an upper sealing ring, and the rotor mounting base and the stator housing are sealed through the upper sealing ring for dust protection.

6. The solenoid valve with a hard seal structure according to claim 2, wherein a platform surface is formed on a threaded cylindrical surface of the screw, and the pressure balancing channel is formed between the platform surface and the axial through hole of the valve core.

7. The solenoid valve with a hard seal structure according to claim 3, wherein the accommodating cavity forms a sealing housing having a sealing space, the sealing housing is covered at an exterior of the rotor and a lower end of the sealing housing is fixedly and sealingly connected to the rotor mounting base by a rabbet; and the rotor is limitedly mounted inside the sealing housing by an upper bearing and a lower bearing, the lower bearing is mounted on a step of the central step through hole of the rotor mounting base, the upper bearing is mounted inside a bearing seat, the bearing seat is circumferentially fit-mounted to an inner wall of the sealing housing and an upper end of the bearing seat abuts against an inner surface of the sealing housing.

8. The solenoid valve with a hard seal structure according to claim 1, wherein one same valve body is provided with a plurality of accommodating cavities, and a valve assembly is mounted inside each of the accommodating cavities.

9. The solenoid valve with a hard seal structure according to claim 1, wherein the valve body is provided with a pressure releasing channel communicating to the fluid passage, and a port of the pressure releasing channel is mounted with a pressure releasing valve.

* * * * *